Dec. 22, 1953   C. P. BALDWIN   2,663,266
ROCKING AXLE STRUCTURE FOR MINING APPARATUS
Original Filed Dec. 20, 1946                    2 Sheets-Sheet 1
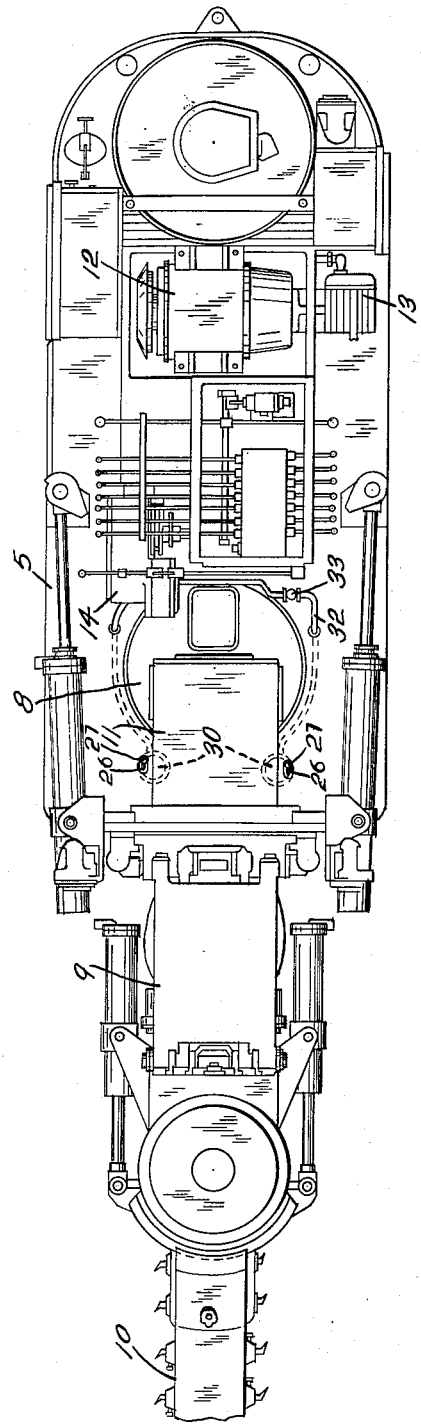
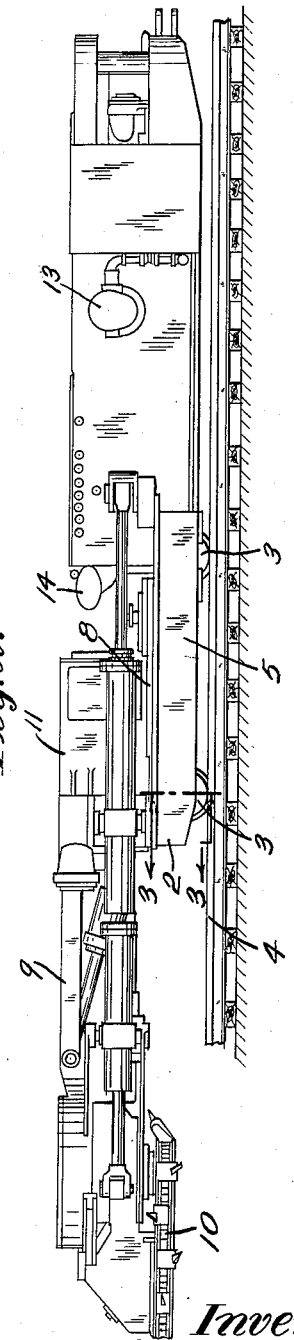
Inventor:
Clyde P. Baldwin.
By Charles F. Osgood,
attorney.

Dec. 22, 1953   C. P. BALDWIN   2,663,266
ROCKING AXLE STRUCTURE FOR MINING APPARATUS
Original Filed Dec. 20, 1946   2 Sheets-Sheet 2
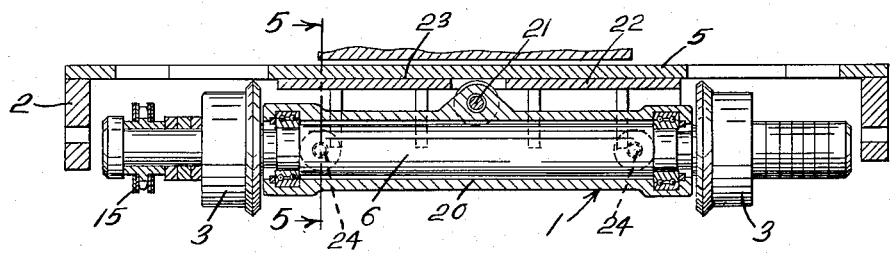
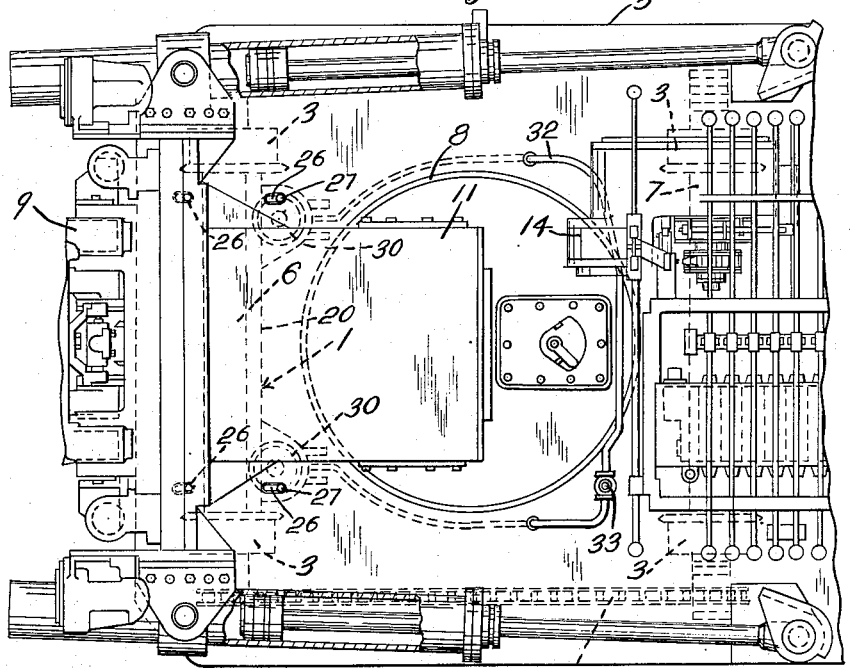
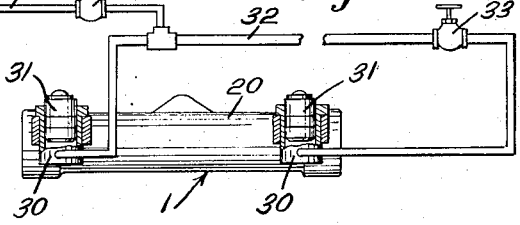
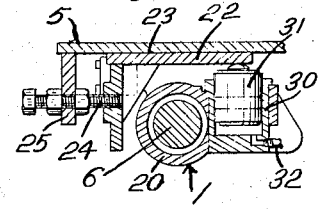
Inventor.
Clyde P. Baldwin
by Charles F. Osgood
Attorney.

Patented Dec. 22, 1953

2,663,266

UNITED STATES PATENT OFFICE 2,663,266

ROCKING AXLE STRUCTURE FOR MINING APPARATUS

Clyde P. Baldwin, Claremont, N. H., assignor to Joy Manufacturing Company, a corporation of Pennsylvania Original application December 20, 1946, Serial No. 717,398. Divided and this application October 25, 1950, Serial No. 192,074

9 Claims. (Cl. 105—101)

1

This invention relates to mining apparatus and more particularly to a rocking axle structure for a mining apparatus of the wheel mounted, track cutter type.

In a wheel mounted, track cutter type of mining apparatus the wheels of the truck of the apparatus must frequently travel over an uneven trackway laid on the floor of an underground mine, and it is desirable that the front axle of the truck freely rock about a longitudinal axis to enable the truck to readily negotiate the uneven track rails. During the kerf cutting operation it is desirable, however, rigidly to lock the pivoted axle against rocking movement since the truck must be held steady at that time to prevent undesirable tilting of the apparatus. The present invention contemplates improvements over known types of mining apparatus in that the rocking axle is hydraulically controlled by hydraulically actuated pistons which are contained in cylinders mounted on the pivoted axle housing and connected by a closed liquid bypass through which the liquid may freely circulate during rocking of the axle and which may be closed by a valve to trap the liquid within the cylinders thereby to lock the axle rigidly against rocking movement. The axle structure of the present invention also embodies a novel adjustable mounting structure which includes an adjustable support by which the pivoted axle and the hydraulic cylinders and pistons are carried and means for adjusting the support relative to the truck frame to vary the location of the axle longitudinally with respect to the truck whereby the drive chain for the truck wheels may be placed under proper tension.

An object of the present invention is to provide an improved mining apparatus having an improved rocking axle structure whereby the wheel mounted truck of the apparatus may readily negotiate the rails of an uneven mine trackway. Another object is to provide improved hydraulically operated means for rigidly locking the axle against rocking movement thereby to maintain the apparatus steady during the kerf cutting operation. Yet another object is to provide an improved adjustable mounting for the axle structure whereby the drive chain for the truck wheels may be placed under proper tension. A further object is to provide an improved rocking axle structure having hydraulically actuated pistons contained in cylinders mounted on the pivoted axle housing together with means for trapping the liquid within the cylinders for rigidly locking the axle against tilting movement. A still further object is to provide an improved hydraulically

2 controlled axle structure having a closed liquid bypass between the cylinders whereby the liquid may freely circulate during rocking of the axle and which may be closed by a valve to lock the pistons against movement to hold the axle rigidly in position. These and other objects and advantages of the invention will, however, hereinafter more fully appear.

This application is a division of my copending application Serial No. 717,398, filed December 20, 1946.

In the accompanying drawings there is shown for purposes of illustration one form which the invention may assume in practice.

In these drawings:

Fig. 1 is a plan view of a mining apparatus in which a preferred illustrative form of the invention is embodied, Fig. 2 is a side elevational view of the apparatus shown in Fig. 1, Fig. 3 is an enlarged cross section taken substantially on line 3—3 of Fig. 2, Fig. 4 is an enlarged fragmentary plan view of the apparatus shown in Fig. 1, illustrating structural details, Fig. 5 is a detail vertical section taken on line 5—5 of Fig. 3, Fig. 6 is a somewhat diagrammatic view, with parts in vertical section, showing the hydraulic fluid system and control valve associated with the pivoted axle.

In this illustrative construction, as shown in the drawings, the improved axle structure, generally designated 1, is embodied in a coal mining apparatus of the wheel mounted, track cutter type similar to that disclosed in my copending application Serial No. 717,398 above referred to. Evidently the axle structure may be of general application and, accordingly, it is not desired to limit it to use with a coal mining apparatus.

The mining apparatus disclosed herein generally comprises a truck 2 mounted on wheels 3 adapted to travel along trackway 4 laid on a mine floor. Supported on a truck frame 5 of the truck between front and rear wheel axles 6 and 7 is a horizontal turntable 8, in turn supporting an elongated pivoted boom 9, which extends forwardly in advance of the forward end of the truck and which carries at its outer extremity a horizontal kerf cutter 10. Supported by the turntable is a motor 11 for driving the kerf cutter, and supported on the rearward portion of the truck frame 5 is a motor 12 for driving a pumping means 13 which provides a source of liquid under pressure for the hydraulic system of the apparatus. A fluid operated propulsion mechanism 14 is provided for driving the truck wheels to propel the apparatus along the mine trackway, and the wheel axles 6 and 7 are connected in driving relation by a conventional chain and sprocket connection 15, shown partially in cross section in Fig. 3 and indicated in dotted lines in Fig. 4. The various features above outlined are fully disclosed in my copending application Serial No. 717,398 mentioned above.

The front axle 6 is suitably journaled in bearings supported within an axle housing 20 which is pivotally mounted at 21 on a frame 22 to rock about a longitudinal axis located centrally between the sides of the truck, as shown in Fig. 3. The frame 22 has a plane top surface 23 which underlies and abuts the plane bottom surface of the truck frame, and the frame 22 is suitably guided for longitudinal adjustment relative to the truck frame by means of adjusting screws 24 connected to a forward vertical plate 25 secured to the truck frame, as shown in Figs. 3 and 5. The truck frame has longitudinal slots 26, as shown in Fig. 4, through which bolts 27 secured to the frame 22 pass, and these bolts may be tightened to clamp the frame 22 firmly in adjusted position relative to the truck frame. Thus, by adjusting the frame 22 longitudinally relative to the truck frame the distance apart of the front and rear axles 6 and 7 may be varied thereby to place the drive chain of the chain and sprocket connection 15 under the proper tension. By provision of pivot 21 the front truck wheel axle 6 is free to rock in a vertical direction relative to the truck frame to facilitate movement of the truck over an uneven trackway, and as the axle tilts the chain of the connection 15 may flex slightly to compensate for such rocking movement. To steady the apparatus, during the kerf cutting operation and to reduce the possibility of tipping, the pivoted axle housing 20 may be rigidly locked to the truck frame by means of vertical hydraulic cylinders 30 secured to the axle housing 20 rearwardly of the front axle 6, as shown in Fig. 5, and containing pistons 31 engaging the bottom of the frame 22, in the manner shown. A bypass pipe 32 controlled by a manually operable valve 33, connects the lower ends of the cylinders 30 together and provides a closed liquid system therebetween. The pipe 32 extends around the turntable 8, as shown in Fig. 4, beneath the truck frame and passes upwardly through suitable openings and across the top of the frame rearwardly of the turntable. The valve 33 is conveniently located at the top of the truck frame at one side of the latter. A conduit 34 (Fig. 6) leads in any suitable manner from the hydraulic fluid system of the apparatus so that liquid may be supplied to the pipe 32 and to the cylinders under the control of a hand valve 35. The valve 35 is normally closed and is opened only to replenish the liquid in the cylinders 30. As the axle 6 rocks about its pivot 21, as the apparatus travels over an uneven trackway, the liquid may freely circulate through the pipe 32 between the cylinders 30, and the liquid may be trapped in the cylinders simply by closing the valve 33 to lock rigidly the parts in position. Since the cylinders and pistons are mounted on the rocking axle housing and engage the bottom of the adjustable frame 22 the entire axle unit is movable longitudinally with respect to the truck frame upon adjustment of the adjusting screws 24. Since the general mode of operation of a coal mining apparatus of the character disclosed herein is fully described in my above mentioned application, Serial No. 717,398, a detailed description thereof is herein deemed unnecessary.

As a result of this invention an improved wheeled truck is provided for a coal mining apparatus and which embodies a rocking axle structure which may freely rock as the apparatus travels over an uneven trackway thereby to facilitate movement of the apparatus along the trackway. By the provision of the improved hydraulic cylinder and piston arrangement associated with the rocking axle the latter may be rigidly locked against tilting movement to hold the apparatus steady during the kerf cutting operation. The novel liquid bypass between the hydraulic cylinders and the control valve for closing the bypass provides an extremely simple form of control for the cylinders. By associating the adjusting means for the drive chain for the truck wheels with the novel axle structure an extremely simple form of chain tension adjustment is afforded. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an apparatus of the character disclosed, a wheeled truck having a frame and an axle structure pivoted on said frame to rock about a longitudinal axis, and hydraulically operated means carried by said axle structure and reacting against said frame for rigidly locking said axle against pivotal movement comprising a pair of cylinders each containing a single acting piston and located on said axle structure at opposite sides of the pivotal axis thereof, and valve controlled bypass means operative when opened to permit free flow of liquid with respect to said cylinders to permit free rocking of said axle structure, and closable at will to interrupt such flow to lock said pistons against movement.

2. In an apparatus of the character disclosed, a wheeled truck having a frame and an axle structure pivoted on said frame to rock about an axis extending longitudinally of the apparatus, and means for rigidly locking said axle structure against tilting movement including extensible single acting hydraulic devices carried by said axle structure at opposite sides of the pivotal axis thereof and reacting against said frame, a bypass conduit for permitting free flow of liquid from one device to the other, and valve means operable at will for cutting off liquid flow through said conduit to trap the liquid in said devices.

3. In an apparatus of the character disclosed, the combination comprising a wheeled truck having a frame and an axle structure pivoted on said frame to rock about an axis extending longitudinally of the apparatus, and hydraulically operated means carried by said axle structure and reacting against said frame for rigidly locking said axle structure against pivotal movement comprising hydraulic cylinders arranged at the opposite sides of the pivotal axis thereof and containing single acting pistons, a bypass conduit connecting said cylinders in free communication with one another to permit liquid flow from one cylinder to the other whereby said axle structure may rock freely about its pivotal axis, and a valve in said conduit operable at will for cutting off liquid flow through said conduit for effecting trapping of the liquid in said cylinders at one side of said pistons, said valve when opened permitting free flow of liquid through said conduit between said cylinders.

4. In an apparatus of the character disclosed, a truck frame, a pivoted axle structure on which truck wheels are mounted, means for pivotally mounting said axle structure on said truck frame beneath the latter to rock relative to said frame about a longitudinal axis located in the longitudinal median line of the apparatus including a horizontal plate beneath said truck frame, hydraulic cylinders mounted on said axle structure rearwardly of said pivotal axis thereof and spaced equidistantly at opposite sides of said pivotal axis, single acting pistons contained in said cylinders and abutting the bottom of said plate, a liquid bypass conduit extending between and connecting said cylinders through which liquid may freely circulate during movement of said pistons as said axle structure rocks about its pivot, and a valve in said conduit operable at will for closing said bypass to trap the liquid in said cylinders at one side of said pistons to hold said pistons against movement thereby to lock said axle structure against tilting movement about its pivotal axis with respect to said plate.

5. In an apparatus of the character disclosed, a truck frame, a horizontal plate underlying said truck frame and guided for longitudinal adjustment relative to said truck frame, means for adjusting said plate, a transverse axle structure pivotally mounted on said plate to rock in vertical planes relative thereto about a longitudinal axis located midway between the sides of the said truck frame, traction wheels carried by said axle structure at the sides of the apparatus, a single drive chain for driving said wheels in unison and adapted to flex slightly as the axle structure rocks about its pivotal axis, said plate being adjustable to vary the location of said axle structure longitudinally relative to said truck frame to place said drive chain under proper tension while retaining sufficient looseness to permit such flexing thereof, and means to clamp said plate in adjusted position to said truck frame.

6. In an apparatus of the character disclosed, a truck frame, a horizontal plate underlying said truck frame and guided for longitudinal adjustment relative to said truck frame, means for adjusting said plate, a transverse axle structure pivotally mounted on said plate to rock in vertical planes relative thereto about a longitudinal axis located midway between the sides of the said truck frame, traction wheels carried by said axle structure at the sides of the apparatus, a drive chain for driving said wheels in unison, said plate being adjustable to vary the location of said axle longitudinally relative to said truck frame to place said drive chain under proper tension, extensible power devices mounted on said axle structure at opposite sides of said pivotal axis and cooperating with the bottom of said plate, said power devices located beneath said truck frame at the opposite side of the longitudinal axis of said axle structure from said adjusting means, said plate sliding relative to said truck frame during aforesaid adjustment thereof and said power devices having rocking contact with said plate whereby said axle structure may rock about its pivotal axis relative to said plate while said devices remain in contact with said plate, and control means for effecting locking of said devices against extensible movement to hold said axle structure rigidly against rocking movement relative to said plate.

7. In an apparatus of the character disclosed, a truck frame, a transverse axle structure located beneath said truck frame and comprising an axle carrying wheels at its ends and a housing in which said axle is journaled, means for pivotally mounting said housing to rock about a longitudinal axis located midway between the sides of said truck frame beneath the latter, hydraulic cylinders mounted on said housing at one side of the longitudinal axis of said axle structure and spaced equidistantly from said pivot beneath said truck frame, single acting pistons contained in said cylinders and reacting against said truck frame to lock said housing against tilting movement, a liquid bypass conduit connecting said cylinders and through which liquid is adapted freely to circulate as said axle structure rocks about its pivotal axis, valve means operable at will for supplying liquid to said bypass conduit to fill said cylinders at one side of said pistons, and valve means operable at will in said conduit for closing said bypass to trap the liquid in said cylinders at said side of said pistons to hold said pistons against movement thereby to lock said housing and said axle rigidly against tilting movement about said pivotal axis.

8. An apparatus as set forth in claim 2 wherein said valve means is operable from a point remote from hydraulic devices near the operator's station on the apparatus.

9. An apparatus as set forth in claim 6 wherein said control means is operable from a point near the operator's station on the machine remote from said power devices.

CLYDE P. BALDWIN.

References Cited in the file of this patent
UNITED STATES PATENTS

| Number | Name | Date |
| --- | --- | --- |
| 1,720,423 | Masury | July 9, 1929 |
| 1,740,810 | Davies | Dec. 24, 1929 |
| 2,353,503 | Rost et al. | July 11, 1944 |
| 2,365,387 | Briscoe | Dec. 19, 1944 |
| 2,381,425 | Deal | Aug. 7, 1945 |
| 2,478,389 | Hagenbook | Aug. 9, 1949 |